(12) United States Patent
Hellsten

(10) Patent No.: US 6,850,186 B2
(45) Date of Patent: Feb. 1, 2005

(54) SYSTEM FOR DETERMINING POSITION AND VELOCITY OF TARGETS FROM SIGNALS SCATTERED BY THE TARGETS

(75) Inventor: Hans Hellsten, Linköping (SE)

(73) Assignee: Totalforsvarets Forskningsinstitut, Stockholm (SE)

( * ) Notice: Subject to any disclaimer, the term of this patent is extended or adjusted under 35 U.S.C. 154(b) by 0 days.

(21) Appl. No.: 10/476,493

(22) PCT Filed: May 8, 2002

(86) PCT No.: PCT/SE02/00895

§ 371 (c)(1),
(2), (4) Date: Nov. 10, 2003

(87) PCT Pub. No.: WO02/093192

PCT Pub. Date: Nov. 21, 2002

(65) Prior Publication Data

US 2004/0130480 A1 Jul. 8, 2004

(30) Foreign Application Priority Data

May 11, 2001 (SE) .............................................. 0101661

(51) Int. Cl.$^7$ ......................... G01S 13/42; G01S 13/50; G01S 13/00; G01S 7/292
(52) U.S. Cl. ............................. 342/93; 342/59; 342/89; 342/90; 342/91; 342/94; 342/104; 342/118; 342/159; 342/175; 342/195; 367/87; 367/89; 367/90; 367/95; 367/97; 367/98; 367/99; 367/117
(58) Field of Search ........................... 367/87–116, 117; 342/27, 28, 59, 82–146, 159, 165–175, 192–197, 450–465, 147, 157–164

(56) References Cited

U.S. PATENT DOCUMENTS

| 4,499,468 | A |   | 2/1985  | Montana et al. |        |
|-----------|---|---|---------|----------------|--------|
| 4,513,286 | A | * | 4/1985  | Irabu          | 342/93 |
| 4,538,152 | A | * | 8/1985  | Wirth          | 342/158|
| 4,622,556 | A | * | 11/1986 | Bryant et al.  | 342/174|
| 4,825,213 | A | * | 4/1989  | Smrek          | 342/161|
| 4,994,809 | A |   | 2/1991  | Yung et al.    | 342/108|
| 5,337,055 | A | * | 8/1994  | Ghignoni       | 342/93 |
| 5,448,243 | A |   | 9/1995  | Bethke et al.  | 342/59 |
| 5,499,030 | A | * | 3/1996  | Wicks et al.   | 342/93 |
| 5,559,517 | A | * | 9/1996  | Didomizio      | 342/174|
| 5,579,011 | A | * | 11/1996 | Smrek          | 342/113|
| 5,808,579 | A | * | 9/1998  | Rademacher     | 342/93 |
| 6,717,545 | B2| * | 4/2004  | Dizaji et al.  | 342/93 |

FOREIGN PATENT DOCUMENTS

JP          6-331727 A   *  12/1994   .............. G01S/7/32

* cited by examiner

Primary Examiner—Bernarr E. Gregory
(74) Attorney, Agent, or Firm—Jacobson Holman PLLC

(57) ABSTRACT

The present invention relates to a system for using signals scattered by targets to determine position and velocity for each of the targets and comprises a set of transmitters and receivers of electromagnetic or acoustic signals, said transmitters and receivers dispersed to known points. Each pair of transmitter and receiver, monostatic or bistatic, is named a measuring facility. The ranges of the transmitters are chosen so that a target at an arbitrary point within the position space can be measured via scattering in the target by at least four measuring facilities. For each measuring facility, target detection occurs with constant false alarm rate in the form of probabilities over resolution cells with regards to range and Doppler velocity and conceivable targets are placed in a 2-dimensional linear space belonging to the measuring facility. The 3-dimensional positions and 3-dimensional Doppler velocities are represented as a 6-dimensional linear position and velocity space subdivided into resolution cells with the same resolution of range and Doppler velocity that is found at the measuring facilities. For each intersection representing detections at at least four measuring facilities the probability is calculated that the intersection is a false alarm emanating intersections between subsets from different targets and when the probability falls below a predefined value, it is given that the intersection contains at least one target. The target positions and target velocities are extracted in this way."

10 Claims, 8 Drawing Sheets

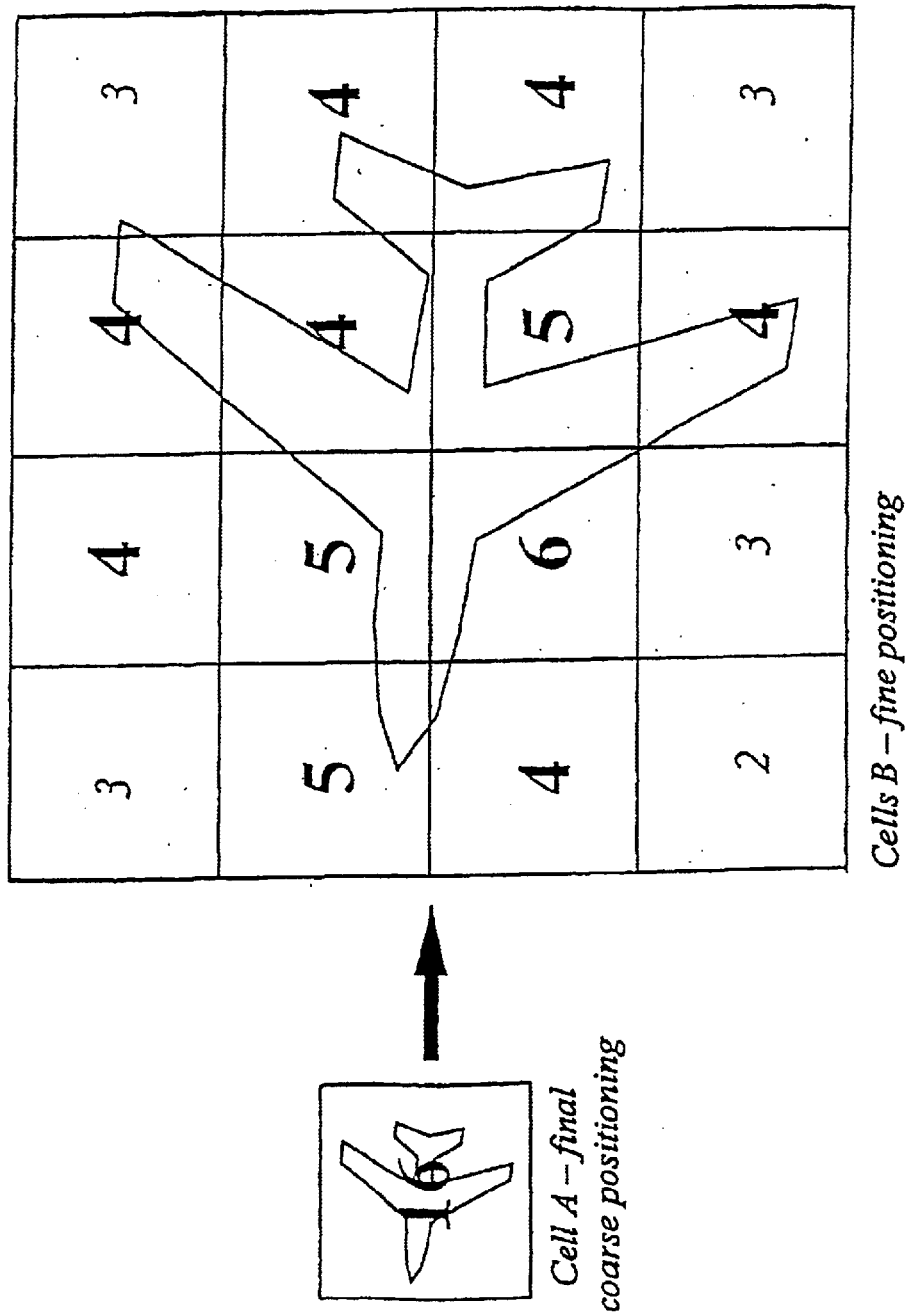

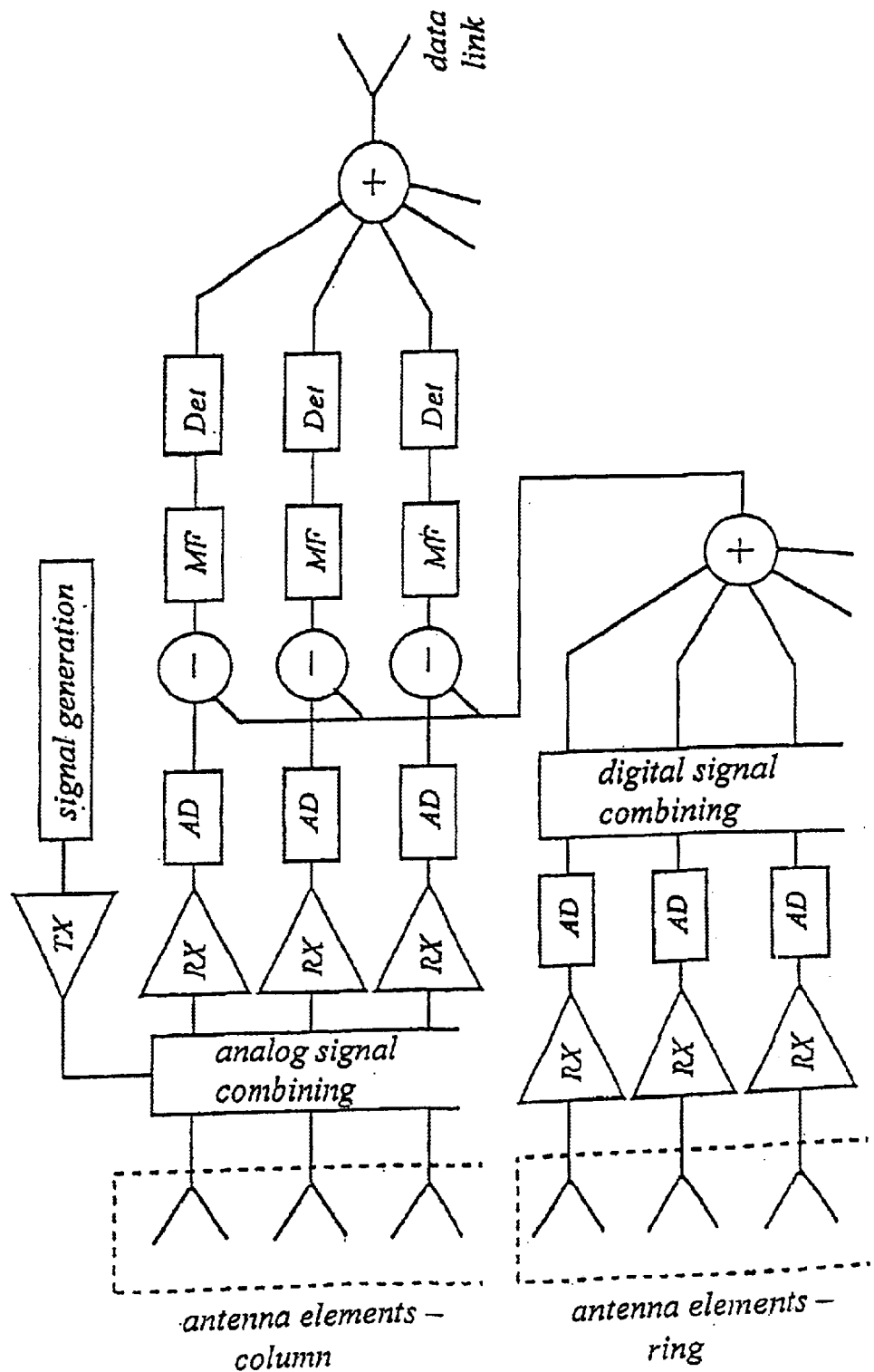

SYSTEM FOR DETERMINING POSITION AND VELOCITY OF TARGETS FROM SIGNALS SCATTERED BY THE TARGETS

This is a nationalization of PCT/SE02/00895 filed May 8, 2002 and published in English.

BACKGROUND OF THE INVENTION

The present invention relates to a system for using signals scattered by one or more targets to determine position and velocity for each of the targets. The targets are situated in a position space comprising a number of transmitters and receivers of electromagnetic or acoustic signals, these transmitters and receivers being dispersed to a number of known points in the position space. The system will be discussed in the following with respect to a radar application. The invention is however equally suited for use in acoustic systems and it is the stated intention of the applicant that this patent application shall concern such systems as well. The system can in general be used in the case where the positions in space and velocity vectors for a very large number of targets shall be determined.

Radar systems of today for surveillance and combat command consist of a small number of long range and capable radar stations. These systems are very vulnerable, partly because the radar stations are relatively easy to detect and partly because they are so few in number. The object of the invention is to improve this situation. The improvement consists partly in that the surveillance function is distributed over a large number of dispersed but relatively simple radar stations, where some can be lost without the position picture being impaired in a crucial manner. As well, single radar stations are small and easily transported and can be put in place on short notice without comprehensive ground installations or other preparations and therefore cannot be detected in advance.

Further motivation to the need of the present new radar technique is that military aircraft of coming generations are expected to have a smaller and smaller radar cross section. Already today there are so-called stealth aircraft which have radar cross sections less than a ten-thousandth of conventional aircraft. In the near future new types of military aircraft will be operative which have just as small radar cross sections but which as well are capable of high performance with respect to velocity and maneuverability. These aircraft will at first be few in number but in time the technique will likely spread to many types of aircraft and to the air force of many nations.

Fundamental physical reasons limit the possibility of stealth embodiment. The ideal, stealth aircraft (something which cannot be constructed today and maybe not even in the future) has a complete electromagnetic adaptation to the surrounding airspace so that incoming radar radiation is completely absorbed by the aircraft. This implies that no reflection (or in other words backscattering) occurs in the direction $-\vec{N}$ regardless of the direction $\vec{N}$ for the incoming radiation. However in the physics of scattering it applies that even in this case the aircraft has a non-disappearing scattering cross section in the directions $\vec{N}'$ which distinguish themselves from the backscattering direction $-\vec{N}$. In fact the scattering cross section in the extended direction $\vec{N}$ for the illuminating radiation is independent of electromagnetic adaptation and stealth embodiment and makes up the square of the geometric cross section of the aircraft projected in the direction $\vec{N}$ divided by the square of the wavelength. Around the energy-scattering concentrated in $\vec{N}$ and at angles which can very well be close to 90° in relation to $\vec{N}$, scattering cross section with suitable choice of wavelength can be expected in parity with the prevailing conventional aircraft of today.

As shall be evident in detail below, the present proposal is based on so-called bi-static radar geometries. In that these are combined with relatively low radar frequencies (UHF) the above-mentioned easily measurable scattering cross sections for stealth aircraft are achieved, and the aircraft can thereby be detected.

SUMMARY OF THE INVENTION

The proposed technique uses a large number of radar stations with relatively short range. The stations are dispersed over a surface, above and around which one wants to be able to detect and measure targets. The stations shall have overlapping coverage, so that each target is detected from several stations. Only range- and Doppler-information and not directional information are used for determination of the target positions. This implies that the radar antennae can be made relatively simple, without having to decrease the scanning capacity or the measuring precision.

By combining at least three radar stations so that at least three mono- or bi-static measurements of range and approaching velocity to a target are obtained, the 3-dimensional position and velocity of the target will be unambiguously determined by the measurements. A special problem is then how to handle simultaneous presence of several targets. A correct determination of target range requires in this case that one knows which measurements at the different radar stations correspond to one and the same target.

It is easily realized that if measurements at different radar stations originate from different targets, these will indeed when combined uniquely determine a position and a velocity for a target, but this will not correspond to a real target. The proposed invention requires that at least four different mono- or bi-static measurements are possible for each point in the space. It will therefore be possible to verify with the fourth radar measurement whether the combination of three measurements are from one and the same target or from different targets. The latter situation implies then that the deduced position and velocity do not correspond to a real target and thereby that the fourth station does not detect targets at this range or with this velocity. When this is the case then the invalid association can be discarded.

It is of course possible that the fourth station finds a target on the position deduced from the three measurement geometries but that this only depends on the coincidence where yet another target happens to have the same range and velocity projection as the one the false association between the three first measurement geometries resulted in. In this case four measurement geometries are not sufficient for a unique determination of target state. If then instead five measurement geometries cover each point in the space then access to a fifth measurement can be utilised to discard or verify remaining associations between four measurement geometries. The probability that these five measurement geometries actually see different targets becomes very small, which is why one can assume that the supported associations of the five measurement geometries give the correct target states. If this confidence is still not sufficient then a six-fold superposition is required etc. In the proposed system a more than 20-fold superposition is obtained by utilising bi-static geometries between a multiplicity of stations with unidirectional antennae. The confidence in freedom from false alarm will thereby be extremely high even in the case that maybe 1000 targets lie within the measurement interval for each radar station.

Fundamental to the invention is the understanding of how a multiplicity of transmitters and receivers shall be arranged to realize this comprehensive superposing of independent measurement geometries as well as how computer calculations of target state, originating from superposed verifications of associations from these independent measurement geometries, shall be practically arranged.

On the side of being able to handle large numbers of targets and high target densities, the proposed technique allows such performance that the system in a common function can be used for surveillance of the air territory over a very large area, say the entire country, combined with direct fire control with precision in metres. In this way the short range and the thereby associated short forewarning time are compensated. The system allows immediate arms action on detection, e.g. through the anti-aircraft missiles being command-controlled based on the relative position between missile and target, and through the missile as well as the target being measured by the system. It is noted that this should be one of the few possibilities for effective engagement of a future threat from stealth aircraft, as not only conventional surveillance radar but also fire control radar and missile target-seekers are expected to be ineffective against stealth.

It is pointed out again that the described measurement procedure is completely independent of the ability of the radar stations to angular measurement. Herein lies an essential difference from conventional radar and in fact the prerequisite (due to the otherwise much too large amounts of data) for the possibility to accurate position determination and thereby among other things the possibility for precision-control of anti-aircraft missiles. The principal advantage lies in that while the system allows outplacement of the flying targets over an enormously large number of possible resolution cells in position and velocity—each in metre size and with velocity resolution in single metres per second—the collection of corresponding large amounts of data is not needed at any single station nor does it need to be represented by the compiled number of stations. This is in contrast to conventional radar, which can be said to measure each cell of resolution to establish whether it is empty or contains a target. The proposed method works under the condition that only one target lies in each velocity/range cell at each station (without any requirement on angular determination). The number of velocity/range cells can be up to $10^5$, which implies that even if more than 1000 targets are found within the range of the radar, the probability that more than one target exists in a cell is small. Since targets are detected as a function of velocity and range, the 3-dimensional position and velocity of the targets are determined by the succeeding algorithm. The amounts of data can be limited even in this subsequent step through suitable formulation of this algorithm.

The 6-dimensional state space of positions and velocities can contain $10^{20}$ cells. This number is of about the same order of magnitude as the number of atoms in some grams of an element (Avogadro's number). It then follows that if sophisticated methods are not utilised to collect data and process signals, this task will be unfeasible even in all future computer equipment as computer memory is limited by being built-up of a finite number of atoms. An efficient formulation of algorithm is thereby not only a wish, but a requirement for the feasibility of the proposed method.

Such a method at hand for efficiently limiting the calculation load in determining target positions and target velocities in corresponding state spaces is based on three mono- or bi-static measurement geometries and N targets detected by each and every of these measurement geometries. First all conceivable target states for the N targets are formed based on this data. These states will be of the order of $N^3$ in number. In the method already mentioned the state of each and every of these candidates can be accepted or discarded depending on whether the deduced target positions and velocities can be found as detections in additional measurement geometries which survey the range within which the candidates are placed.

This direct method is however afflicted with several weaknesses:

Establishing target positions and target velocities from radar data is a demanding calculation. Obtaining target positions for each and every of the $N^3$ target candidates implies among other things (for bi-static measurement geometries) the solving of a $6^{th}$ degree algebraic equation. As well one must then check each candidate state against all facilities reaching the corresponding target position. This gives a processing algorithm consisting of $KN^3$ elementary calculation steps. Unfortunately K becomes with necessity a relatively large number (say >1000), as this implies the mentioned calculation and then among other things the complexity of solving the $6^{th}$ degree equation. If as well N=1000 the number of calculation steps>$10^{12}$ which can be regarded as unpractical and inefficient if not in principle impossible.

By initially choosing 3 of perhaps 20 covering radar stations there is a clear risk that some of these did not happen to observe a certain target. Maybe because the target has the mentioned stealth embodiment or because it appears at an aspect angle unsuitable for this station (it has 0-Doppler and is drowned in the ground echo) or that weather and propagation conditions happen to be unsuitable at the moment of measurement. Even though in this case perhaps all the other 20 radar stations can detect the target, the target will all the same not be measured with this method. This is a crucial disadvantage, as this type of situation can very well occur and the radar system must function even in this case.

Based on these arguments the present invention uses another principle for target detection.

The purpose of the invention is to solve problems of determining velocity and position of targets by using the above method which builds on a large number of overlapping radar stations. This is done by the invention being given the features that appear from the following independent claim. Suitable embodiments of the invention will be evident from the remaining claims and comprise different concrete methods of placing transmitters and receivers and concrete embodiment of calculation steps, and also an antenna arrangement especially suitable for this context.

BRIEF DESCRIPTION OF THE DRAWINGS

The invention will be described in detail in the following with reference to accompanying drawings, where FIG. 1c shows fine positioning with four measurements in accordance for each sub-reflector, FIG. 5 shows an antenna arrangement suitable for the application and FIG. 6 shows a suitable fundamental arrangement for a radar receiver.

DETAILED DESCRIPTION OF THE INVENTION

Figure 1A:
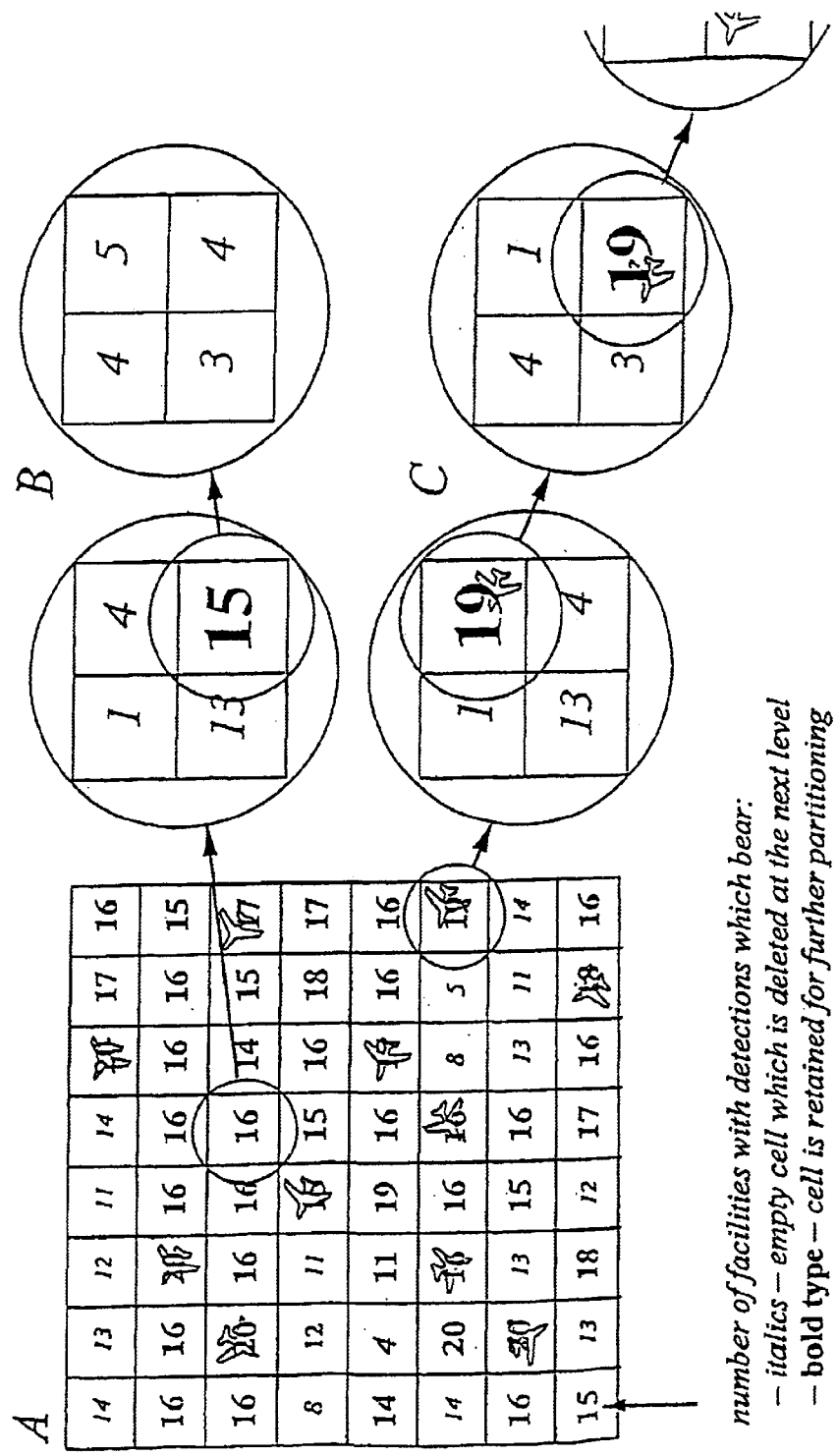
FIG. 1a shows the principle of coarse target positioning by superposed radar measurements and refinement of resolution cells; the number of facilities with detections which bear are given in each respective resolution cell, where established empty cells are marked with italics and cells which are retained for further partitioning are marked with extra bold type.

The system basically consists of a number of transmitters and receivers dispersed to known points in a position space, as well as analysis equipment. The system can, as stated, work with electromagnetic or acoustic signals. A conventional radar is mono-static, which means that the transmitter and receiver pair is located together. If they are spatially separated, however, the equipment is called bi-static. In the system it is expected that measurements can be made bi-statically and as well mono-statically. In the following a pair of a receiver RCVR and a transmitter XR, regardless of whether the measurement is bi-static or mono-static, is called a measurement facility.

The analysis equipment determines the instant for sending signals, and received signals are parameterised as a function of path of propagation and change in path of propagation between transmission point and reception point according to established principles for radar. Change in path of propagation is approximated through Doppler estimation. Further the analysis equipment stores and analyses received signals in the entire system in ways that will be described in detail below. This assumes communication between the different transmitters and receivers and the analysis equipment. The communication technique necessary for the invention is established and consequently does not in itself form any part of the invention and will not be discussed explicitly.

It is necessary for the invention that the range of the transmitters is chosen so that a target at an arbitrary point within the position space can be measured via scattering in the target by at least four measurement facilities. As already discussed, this is not a preferred choice but rather an absolute prerequisite for the functioning of the invention. This is investigated further below in the more detailed examination. It is there also evident that the invention functions even better with more measurement facilities.

In continuation the following conventions of notation will be used: vectors are given by an arrow above the symbol, e.g. $\vec{N}$. Affine points e.g. in the position space are noted by a line above the symbol, e.g. $\overline{X}$. Sets are noted with extra bold type letters, e.g. X. Measurement facilities (mono- or bi-static) are noted with lowercase Greek letters.

At each measurement facility $\phi$ target detection occurs with the constant risk of false alarms—"Constant False Alarm Rate", CFAR—in that the signal intensity is compared with the noise intensity for each cell of resolution with regards to the range and Doppler velocity. Noise can be thermal or caused by signals irrelevant to the radar function, but fulfils some given statistical distribution. Those cells where the measured signal intensity exceeds the expected noise intensity by some given probability are stated to contain targets, and those cells where the measured signal intensity lies below the expected noise intensity are stated to be empty.

In order to go from detections to real target positions, the analysis equipment uses a target positioning algorithm which implies that each measurement facility $\phi$ places $n_i$ target candidates in $n_i$ of N resolution cells in a 2-dimensional linear space of ranges and Doppler velocities $S^2_\phi$ belonging to the measurement facility as well as 3-dimensional positions and 3-dimensional Doppler velocities being represented in a 6-dimensional linear position and velocity space $S^8$ subdivided into $N^3$ resolution cells $X \subset S^6$ with the same resolution of range and Doppler velocity found at the measurement facilities.

Given a cell $X \subset S^6$ there are a number of facilities $\{\phi, \phi', \phi'', \ldots\} = \Phi(X)$ which bear on the cell. Which facilities to consider in $\Phi(X)$ are mainly dependent on the range of the facilities and nearness to the position for X but also wave propagation conditions and can thus depend on e.g. weather. It is however assumed that $\Phi(X)$ is always known for each $X \subset S^6$. For each facility $\phi \in \Phi(X)$ there is as well a known reproduction $X \subset S^6 \to m_\phi(X) \subset S^2_\phi$ which relates target state to measured values at each facility $\phi \in \Phi(X)$. Let $n(X)$ be the size of the set $\Phi(X)$ that is the number of measurement facilities which bear on X.

At a certain moment let $n'(X)$ be the number of facilities $\phi \in \Phi(X)$ for which $m_\phi(X)$ contains a detection, i.e. the number of measuring facilities which detect targets that hypothetically should be able to lie in X. Consider the quotient $\alpha(X) = n'(X)/n(X)$. In an ideal case all facilities which bear on the cell X also always detect the target which finds itself in X, whereby $\alpha(X) = 1$ should apply in the cases where X contains a target. However in reality it can happen that only a fraction of the facilities in $\Phi(X)$ comprehend the target in which case $\alpha(X) < 1$. The reasons for this can be different, mainly that the conditions of propagation of radar signals are not those assumed or that the target has a smaller radar cross-section than was assumed.

Thus as a criterion for target positioning in $S^8$ it should be utilised that $\alpha(X)$ is greater than a value given beforehand, which is chosen with regard to such a limited probability of discovery and which value thus can be less than one. On the other hand, a much too small threshold value for $\alpha(X)$ implies risk for false alarms in that for some cell X that in reality does not contain any target, $m_\phi(X)$ contains targets for a sufficient number of facilities $\phi \in \Phi(X)$. This risk for false alarms can be determined by probability calculation. A useful formula of approximation is $$p^{FA}(n') \approx e^{-n' e^{-M/N}}$$

The formula gives the probability for a false target to exist in an arbitrary cell, given that n' measurements are assumed sufficient for detection, M is the expected number of targets and N the number of resolution cells. The formula is based on false alarms arising completely through associations between detections of different targets at the different facilities. The assumption can be assumed correct if $M \gg n' \geq 3$. As an example it can be mentioned that if $M = 10^3$ then the following applies $N = 10^2$, $n' = 4 \Rightarrow p^{FA}(n') = 0.99999 \ldots$
$N = 10^2$, $n' = 20 \Rightarrow p^{FA}(n') = 0.99$
$N = 10^3$, $n' = 4 \Rightarrow p^{FA}(n') = 0.1$ $N=10^3$, $n'=20 \Rightarrow p^{FA}(n')=10^{-21}$ $N=10^5$, $n'=4 \Rightarrow p^{FA}(n')=10^{-8}$ $N=10^5$, $n'=20 \Rightarrow p^{FA}(n')=10^{-40}$ We see that if the number of resolution cells in $S^2_\phi$ is less than the number of targets N<M then almost all of the cells in $S^8$ are occupied by false alarms. If the number of resolution cells in $S^2_\phi$ is in parity with the number of targets N≈M then the degree of occupation depends in large on the degree of superposition. When the number of resolution cells is significantly larger than the number of targets N>>M then certainly the probability for a target in an arbitrary cell is small but since the state space $S^8$ contains $N^3$ resolution cells (i.e. $10^{15}$ cells if $N=10^5$) then the total probability for false targets existing in some cell is larger to a corresponding degree. It is obvious that with chosen parameters n'=4 is insufficient to eliminate false targets from the state space while n'=20 is more than sufficient.

In fact the large redundancy in the form of many superposed measurement geometries gives a decisive possibility to quickly carry out signal processing for association between measurement geometries. This quick procedure is based on the ability to carry out a preliminary association with a resolution coarser than the final one. These coarse cells become relatively few in number but the varying redundancy makes a certain number of cells empty all the same and containing neither targets nor false alarms. These cells can then be discarded in the preliminary association and the remaining cells retained for a finer cell division. This is the basis of the computer implementation of the target positioning algorithm described in the following, see also FIG. 1a.

In FIG. 1a the left part of the figure, A, shows a distribution of empty cells and cells containing flying targets. These cells are coarse and for this reason there are for each cell many measurement facilities detecting targets that in principle can lie in the cell. The numbers indicate how many such facilities are found for each cell. If the number for a certain cell is in italics then this indicates that the number of facilities lies below the fraction of possible number of facilities required to make it believable that the cell contains a target. Cells retained for further partitioning are marked with extra bold type.

The upper right part of the figure, B, shows a subdivision of a cell which does not contain targets, and below this the lower right part of the figure, C, shows subdivision of a cell containing targets, Here it is shown how during additional subdivisions the original number of detections is shown to lie in a certain position, which is established with good precision as the cell subdivision becomes finer.

On analysis one chooses the original cell subdivision such that $S^8$ is divided into $m_0$ disjunctive but congruent cells $X_{1j}$. The cells are assumed here to be parallele-pipeds. However other cell geometries can also be considered. The number $m_0$ should not be larger than it allows for each cell a number of coefficients (of magnitude 100 for 20-fold superposition, see below) determining the reproductions $m_\phi(X)$ to be stored in a fast memory in the computer that carries out target positioning. Thus $$\frac{\Omega_0}{\omega_1} = \frac{\mu(S^6)}{\mu(X_{1j})} = m_0$$

where $\mu(\ )$ denotes the volume of an area in the 6-dimensional position and velocity space. Assume now that a certain fraction of the original cells $X_{1j}$ are found empty according to the earlier discussed target positioning criterion. We then subdivide the remaining cells into sub-cells so that we can as closely as possible obtain as many new cells as we had in the original subdivision. Thereby the memory of the computer is again loaded to a similar degree and the calculation of the next level is carried out identically as for the original.

It must be noted that cells shall be subdivided such that each original cell is evenly divided into new cells as otherwise we would not fully utilise the earlier knowledge on which cells are empty and which can contain targets. Denote with $\Omega_i$ the total volume of cells that the target positioning procedure notes as non-empty in the subdivision level i. Thus the subdivision relationship is chosen by rounding off the quotient $\Omega_0/\Omega_1$ to the nearest larger integer $$h_2 = \underset{+\infty}{\mathrm{int}} \frac{\Omega_0}{\Omega_1}$$

Note that in initial divisions the probability of false alarms can be very large, e.g. $\Omega_1=0.999\ldots\Omega_0$. In this case $h_2=2$ all the same. Cells are now subdivided according to $$\mu(X_{2j}) = \omega_2 = \frac{\omega_1}{h_2}$$

It is then not important how cells are subdivided but rather how much the volume is reduced. Cells can be divided by making the subdivision of velocity finer in one or several dimensions or by refining the spatial resolution instead.

Assume now that again a certain fraction of the refined cells $X_{2j}$ are found empty according to the target positioning criterion. We divide the remaining cells into sub-cells so that we can as far as possible obtain as many sub-cells as we had in the original division. Thereby the memory of the computer is again loaded to the same degree and the calculation of the next level can take place in a manner identical with the initial one. This happens if we, starting with the volume $\Omega_2$ of remaining sub-cells choose the volume of refined cells $\omega_3$ according to $$\left.\begin{array}{l} h_3 = \underset{+\infty}{\mathrm{int}} \dfrac{\Omega_1}{\Omega_2} \\ \omega_3 = \dfrac{\omega_2}{h_3} \end{array}\right\}$$

Generally a recursive procedure of refined cell subdivisions is obtained $$\left.\begin{array}{l} h_{i+1} = \underset{+\infty}{\mathrm{int}} \dfrac{\Omega_{i-1}}{\Omega_i} \\ \omega_{i+1} = \dfrac{\omega_i}{h_{i+1}} \end{array}\right\}$$

which continues until a velocity resolution is achieved corresponding to the measured Doppler resolution.

Regarding spatial resolution the break criterion is more subtle. Two complications that arise from the finite extent of a target should be noted:

A. The intention is to obtain a resolution that is finer than the extension of the target. The target positioning criterion, given by $\alpha(X_{ij})$, that facilities measuring the target in different geometries measure the same range to the target, cannot be applied to this fine resolution, as the sub-reflectors of a flying target normally cannot be detected from other than certain observation geometries (for example the root of a wing on an aircraft can only be detected from one side). Measurements originating from the resolution cells $X_{ij}$ which only include parts of a target will therefore not be creating sufficiently large values of $n'(X_{ij})$.

B. Even when the spatial cell subdivision in $S^8$ is coarser than the extension of the target, the target positioning criterion can be inapplicable if a target is lying on the border between two adjacent cells $X_{ij}$ and $X_{ij'}$. In this case a part of the sub-reflectors of the target will be assigned to one cell and the rest of the reflectors to the other cell. There is then a risk that neither $\alpha(X_{ij})$ nor $\alpha(X_{ij'})$ will be sufficiently large for the target to be detected. The risk that this happens is small if the cells are significantly larger than the targets, but it increases and becomes unacceptably large when the spatial cell size approaches the size of the target.

Considering these complications, target positioning is carried out in three steps:

1. Resolution of false alarms. In this first step the target positioning criterion given by
   $\alpha(X_{ij})$ is used and takes place according to the earlier described procedure until resolution volumes are reduced to as small a spatial cell volume as possible. However it must be large enough so that the risk of targets lying on the edge of cells
   is negligible and thus the resolution be coarser than the extension of the target. This level should still be sufficiently fine for false alarms to be few in number.
2. Final coarse positioning. Here the resolution is refined further with said procedure
   with the difference that more cell divisions $X^{(1)}_{ij}$, $X^{(2)}_{ij}$, ... of $S^6$ are considered. The
   cells $X^{(1)}_{ij}$, $X^{(2)}_{ij}$, ... are congruent but differ for respective level i in translations
   fractions of the cell length in the spatial domain. Since few false targets
   are expected and only cells in the near surroundings of the target are considered, an overlapping cell subdivision will not be especially demanding to handle calculation-wise. The given target positioning criterion is used for all cell subdivisions $X^{(1)}_{ij}$, $X^{(2)}_{ij}$, ... Assume that we consider cell subdivisions that differ by half a cell length. If a target does not have a larger extension than half the cell size then it will surely be enclosed in at least one cell $X^{(k)}_{ij}$, according to FIG. 1b. Target positions can then be interpolated to positions within half the cell size. This is done by the target completely or partially lying in $X^{(k)}_{ij} - X^{(k)}_{ij'}$ if it is detected in $X^{(k)}_{ij}$ but not in $X^{(k)}_{ij'}$ and lying completely in $X^{(k)}_{ij} \cap X^{(k)}_{ij'}$ if it is detected in $X^{(k)}_{ij}$ and in $X^{(k)}_{ij'}$. For cell subdivisions with finer overlapping, targets with size approaching that of an entire cell can be considered and positioning improves to a corresponding degree.

Figure 1B:
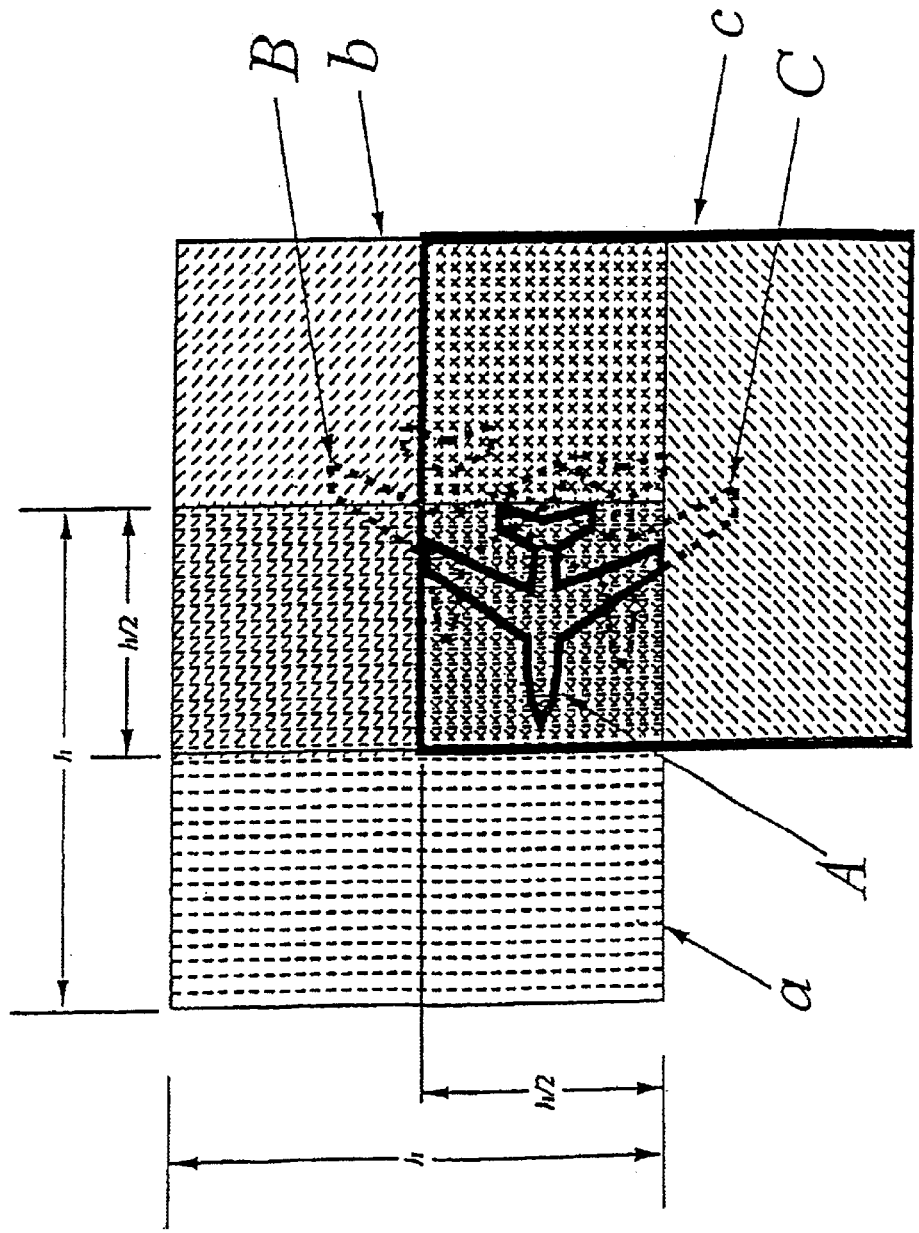
FIG. 1b shows target positioning by three mutually independent translated cell subdivisions.

In FIG. 1b a target A is shown which lies completely within the cell a. If the target is translated to B so that it cuts an edge of the cell, it lies with certainty in one of four cell-halves of the original cell and lies thereby in a cell b that is distinguished from a by translation half the cell length along an edge line. If the target is translated to C and cuts two edges, it is enclosed in one of four cell quadrants c which are distinguished from a by translation along two edge lines. In three dimensions it takes seven cell divisions half the cell length to be sure of enclosing targets which are not larger than half the cell length.

3. Fine positioning. In this final step a cell subdivision $X_{n+1j}$ is carried out in which single reflectors in the target are resolved by utilisation of the full bandwidth and resolution ability of the radar facilities. It is assumed thereby a priori that the target lies within a cell $X_{nj}$, obtained according to point 2, the cell having about the expected size of the target. According to point A, earlier target positioning criterion given by several facilities which bear on a point reflector in $X_{n+1j}$ cannot be applied. It is nevertheless now completely acceptable to only require e.g. verification with four measurement facilities on positioning of sub-reflectors, i.e. $\alpha(X_{ij})=4/n(X_{ij})$. This is because faulty associations between detections with large probability give positions lying outside of $X_{nj}$, and which have thus already been established as empty. These four measurement facilities will have similar observation geometry whereby it is assumed that the target positioning criterion is fulfilled by a sufficient number of real sub-reflectors in flying targets. This is shown in FIG. 1c, which shows a target completely inside one single cell A after coarse positioning and also reflexes from the target subdivided into sub-cells B.

With the determination of the position of sub-reflectors, the radar measuring procedure is regarded as complete. In the application precision engagement of flying targets there remains further data processing in the form of target tracking, target recognition and choice of point of impact. The information needed for these procedures is found in collected radar data. It is e.g. possible to use established pattern recognition methods in order to find the orientation and extension of flying targets from the position of the sub-reflectors. Important a priori-knowledge is found in the common velocity vector of the sub-reflectors, which give a dimension for determination of orientation. Furthermore the variety of radar facilities implies a genuine 3-dimensional reproduction of flying targets, whereby e.g. normal right/left symmetry of flying targets guides to the final determination of orientation and establishment of the main dimensions of the flying target.

We describe now in greater detail the reproductions $m_\phi(X)$ which shall be implemented in the computer. Assume that measurement data from all facilities that bear on a common volume $P_0$ of positions is stored in a computer. Here the 6-dimensional state space $S^6$ regards this volume combined with a velocity volume $V_0$, such that $S^8=(P_0,V_0)$. Let $X^{ij}=(P_{ij},V_{ij})$ be a cell subdivision of $S^8$ in parallelepipeds in position and velocity space. It is noted that the cell subdivision is completely given by a rectangular grid of corner points $\overline{X}_{ij}=(\overline{P}_{ij},\overline{V}_{ij})$ for the parallelepipeds. The reproductions $m_\phi(X_{ij})$ are defined by maximal and minimal values of range and Doppler velocity $r_{\phi,ij}^+,r_{\phi,ij}^-$ respectively $v_{\phi,ij}^+$, $v_{\phi,ij}^-$ for each cell $X_{ij}=(P_{ij},V_{ij})$ and with regard to each facility $\phi \in \Phi(X_{ij})$. Thus is defined $$m_\phi(P_{ij},V_{ij})=([r_{\phi,ij}^+,r_{\phi,ij}^-]\cdot[v_{\phi,ij}^+,v_{\phi,ij}^-])$$

where [a,b] denotes the interval from the number a to the number b.

As earlier mentioned the number of cells in $S^6$ can be so large that storage of the numbers $r_{\phi,ij}^+,r_{\phi,ij}^-$ and $v_{\phi,ij}^+,v_{\phi,ij}^-$ for each cell and facility is an impossibility. To instead calculate $r_{\phi,ij}^+,r_{\phi,ij}^-$ and $v_{\phi,ij}^+,v_{\phi,ij}^-$ separately for each cell implies, as also mentioned, the complicated procedure of solving a $6^{th}$ degree equation. However it is possible to find $r_{\phi,ij}^+,r_{\phi,ij}^-$ and $v_{\phi,ij}^+,v_{\phi,ij}^-$ quickly through linear interpolation. In this case an initial cell subdivision $X_{1j}=(P_{1j},V_{1j})$ of $S^6$ is assumed, which is not larger than necessary interpolation coefficients for the continued refinement of this cell subdivision can be stored for each cell and facility. The corner points $\overline{X}_{ij}=(\overline{P}_{ij},\overline{V}_{ij})$ for the refined cell subdivision are calculated simply from $\overline{X}_{1j}=(\overline{P}_{1j},\overline{V}_{1j})$. The numbers $r_{\phi,ij}^{+}$, $r_{\phi,ij}^{-}$ and $v_{\phi,ij}^{+}, v_{\phi,ij}^{-}$ follow from knowledge of the corner points $\overline{X}_{ij}=(\overline{P}_{ij},\overline{V}_{ij})$ and the unit normals $\vec{N}_{\phi,ij}$ for the intersection with $P_{ij}$ of the range surfaces corresponding to constant (mono- or bi-static) range with regards to the facility φ. The unit normal can so long as the cells are not too big be determined with good precision starting from a fixed but characteristic value for the main radii of curvature $R_{\phi j'}$, $R_{\phi j}$ and the unit normal $\vec{N}_{\phi,1j}$ for the intersection of the range surfaces with $P_{1j}$. Then for interpolation it is required that four numbers be stored (of which $\vec{N}_{\phi,1j}$ is described by two angles) for each facility which bears on each initial cell $X_{1j}=(P_{1j},V_{1j})$.

Figure 2:
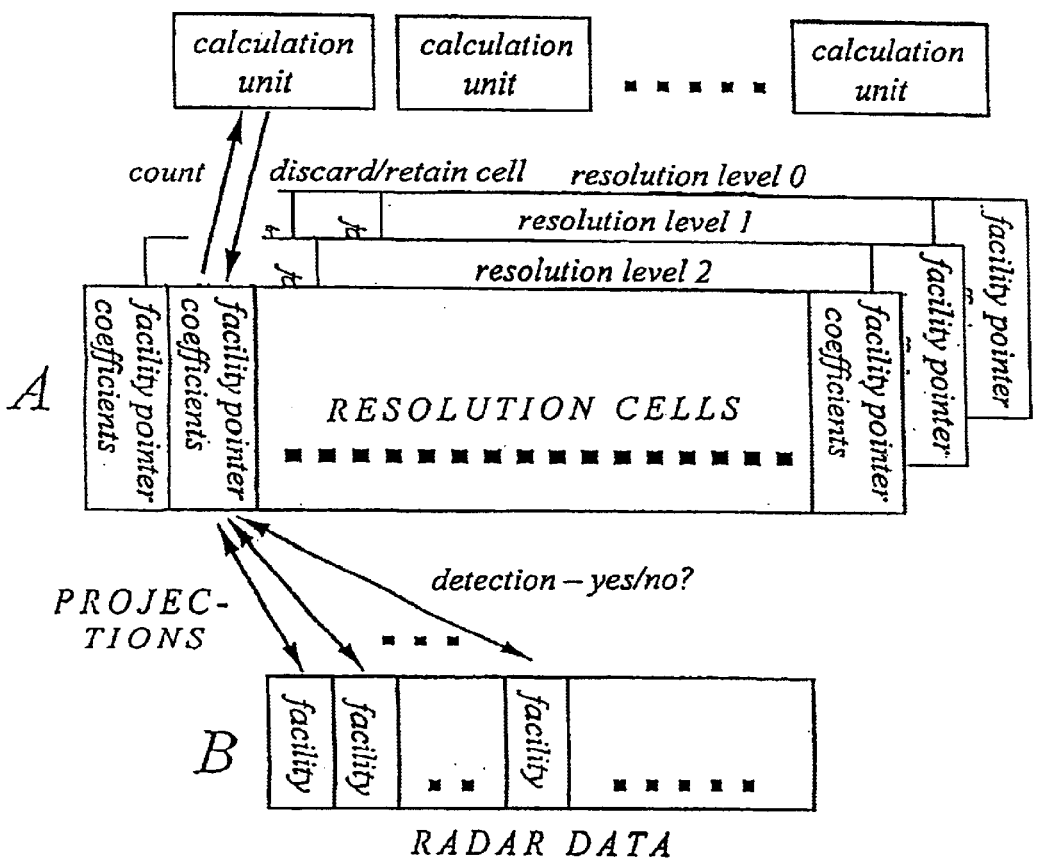
FIG. 2 shows a computer architecture for carrying out the target positioning.

The transfer of the above procedure to a computational scheme is relatively obvious, see FIG. 2. Assume that measured data from all facilities which bear on a common volume $P_0$ of positions are found stored in a computer, and that this data in a computer memory B is sorted in memory banks per facility and within each such bank in range and velocity. The spatial cells $P_{1j}$ form address areas in another memory A in which the coefficients are stored for interpolation calculations of the reproductions $m_\phi$ for cells $X_{ij}=(P_{ij'},V_{ij'})$ where $X_{ij'}$ is a sub-cell within $X_{1j}$. Apart from coefficients the address areas A contain pointers to memory banks for data which originates from facilities bearing on the cell $X_{1j}$ and thus at least some of these sub-cells. Coefficients are taken from A to form the reproductions $m_\phi(X_{1j})$ for bank after bank. A third memory C contains calculators, so that there is a calculator for each cell $X_{1j}$ and this being counted up one unit for each time a target is detected via $m_\phi(X_{1j})$ after which $α(X_{1j})$ is evaluated. A certain number of cells will in this way be established as empty of targets. Going from to which degree this occurs, the resolution is refined in the non-empty cells and new calculators are initiated in C for the refined cells. The process is repeated in a similar way until final resolution has been achieved. It is noted that the above procedure of refining the cell subdivision so that the total number of cells can as far as possible be kept constant guarantees high efficiency regarding memory loading by this type of computer computational scheme.

Figure 3:
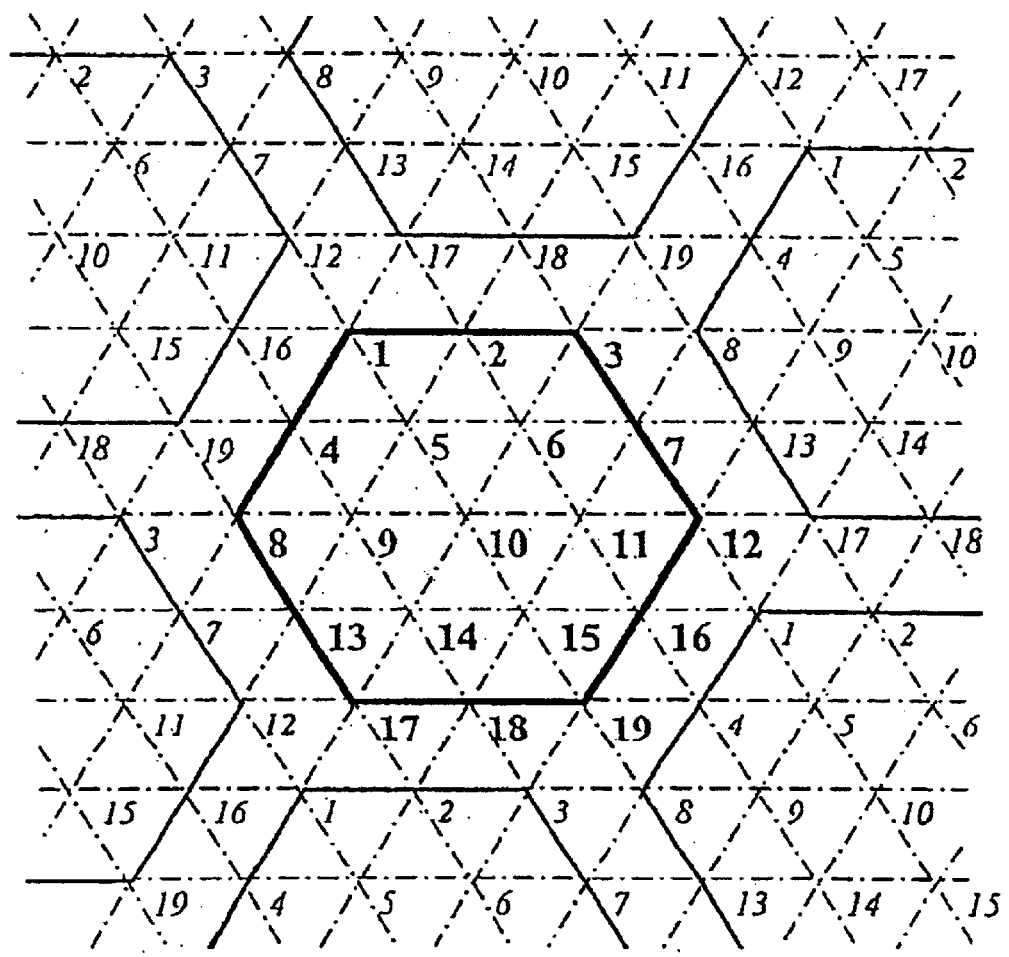
FIG. 3 shows frequency assignment within a radar grid at stepped frequency.
Figure 4:
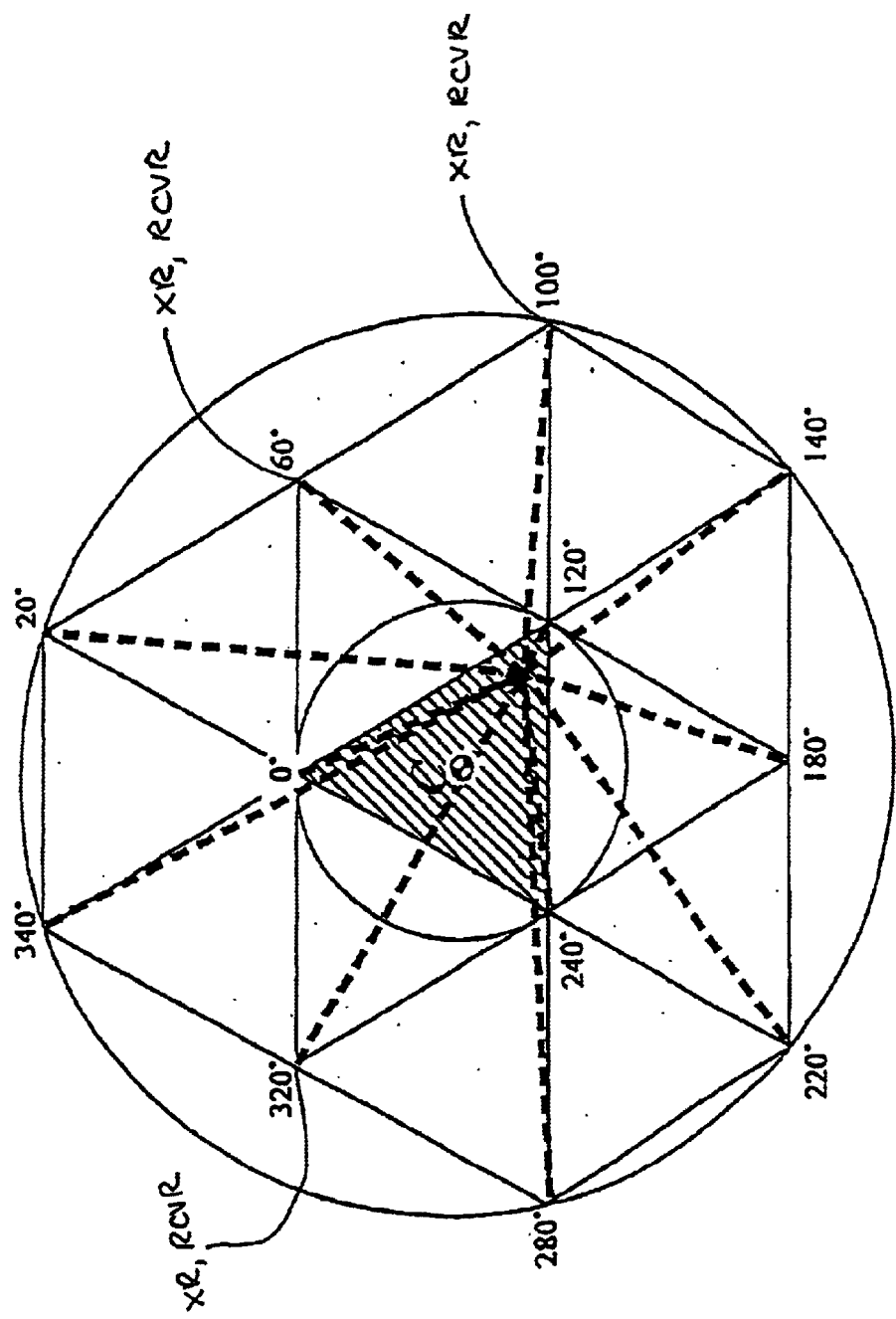
FIG. 4 shows bi-static radar configurations that cover a triangular prism of positions.

A favourable way of placing transmitters and receivers such as a transmitter XR and a receiver RCVR constituting a measurement facility, is to co-locate them with e.g. a common antenna at each grid point in a regular equilateral grid (see FIG. 4). By regular equilateral grid is understood here a number of points in a plane, which make up the corners of an equilateral polygon which through translations precisely covers the plane. An equilateral grid can be rhombic, quadratic or hexagonal based on the chosen polygon. A rhombic grid made up of equilateral triangles is called equidistant since the possible grid translations are all multiples of one and the same grid spacing, see FIG. 3.

For the proposed surveillance system the equidistant network is preferable as it allows the most even possible dispersal of radar stations over the surface. The quadratic network is also conceivable and implies actually no definite disadvantages compared with the equidistant. We concentrate the discussion here to the equidistant network which thus makes up a concrete example of embodiment of the surveillance system. It shall be stressed that the placement of stations in an equidistant grid needs only be approximate and can deviate more or less from the regular pattern to adapt to external conditions as topography etc.

When bi-static geometries are included the number of possible measurement configurations becomes large and also the desired superposition of independent measurement geometries. For each station the number of bi-static facilities in which this station is included is 12 if the other station in the bi-static pair lies within a grid distance d and 36 if the other station is allowed to lie within two grid distances 2d. Observe that each facility given by a transmitter in a grid point and a receiver in another has a reverse facility where the receiver lies in the first grid point and the transmitter in the other. Both facilities measure under the same geometric conditions and give the same data so that only 6 or 18 configurations respectively can give independent data for the respective grid spacing. Above all in the latter case the desired degree of multiple superposition is achieved so that the continued discussion of range of the radar stations is based on the separation between transmitter and receiver in bi-static geometries being allowed to extend up to and including 2d.

Consider a position space in the form of a triangular prism with a triangle of radar stations separated by a grid spacing as base and with a height h (the expected maximal target height). The triangle is superposed (completely or partially) by 3×36=108 bi-static facilities, given that the radar stations have pulse repetition frequency and transmission effect chosen according to established principles. However only the configurations that have e.g. receivers in the corners of the triangle, i.e. 54 of the 108 facilities, can give out mutually independent bi-static data. In fact among these 54 configurations the bi-static facilities between the corners of triangles are counted two times, so only 51 of the 54 facilities give independent data. Besides this bi-static data mono-static data is also collected covering the triangular prism. To which degree this occurs is not dimensioning for the choice of radar parameters and is described therefore somewhat later below.

The following proposal for transmission-/reception pattern for the radar stations gives the possibility to utilise the wished bi-static geometries in the grid. The necessary radar bandwidth B for a certain range resolution is divided into just as many sub-bands as the number of stations lying within a sub-set $\Psi(2d,\overline{P})$ of the grid which makes a regular hexagon with radius 2d, centred around the grid point $\overline{P}$. The number of sub-bands is thus 19, see also FIG. 3. Radar transmission and radar reception is carried out with the known technique called "stepped frequency" according to which technique each sub-band is transmitted and received completely before the same procedure is repeated for the next sub-band following a predetermined order. For the present application the receiver of each station is designed so that reception can take place over the entire bandwidth during each frequency step. As each station within $\Psi(2d,\overline{P})$ is assigned one and only one sub-band, the received signal for the station at point $\overline{P}$ will cover the entire radar band B while each sub-band can be uniquely assigned,some certain one of the 19 stations in $\Psi(2d, \overline{P})$. Moreover, if the same order of the sub-bands is applied for all stations in $\Psi(2d, \overline{P})$, data for the entire radar band will have been obtained for all bi-static configurations in $\Psi(2d, \overline{P})$ that have reception in $\overline{P}$. A transmission pattern is established over the entire grid in that the transmission pattern in $\Psi(2d,\overline{P})$ is also utilised in $\Psi(2d, \overline{P}+m\overline{G}_i)$ where m and i are integers and $\overline{G}_i$ is a vector with length 3d and direction i×60', compare with FIG. 3. It is realised that precisely as at point $\overline{P}$ the transmission pattern implies data for the entire radar band for all bi-static configurations in $\Psi(2d, \overline{P}')$ which have reception at each grid point $\overline{P}'$.

A condition for the signal registered at each grid point $\overline{P}$ to be uniquely assigned one of the transmitters in $\Psi(2d,\overline{P})$ is that monitoring at each radar station does not take place for longer time than $$t_{steg} = \frac{3d}{c}$$

after the start of transmission. In fact it is the simplest form of embodiment of the surveillance system that the monitoring time is limited to step time minus the transmission time. In this way the wished reflected signals can be received completely before crosstalk occurs. A more advanced procedure is to modulate the transmitter signal by e.g. linear frequency sweep. In this way the crosstalk signal is received at the same time as radar reflexes, after which both signals can be separated in range and the step time is fully utilised. Several known methods can be applied to suppress crosstalk from pulse to pulse and thereby to stop ambiguous echoes. Such methods are change of modulation for the transmission signal between frequency steps and change of the order of frequencies from step period to step period.

With the given time limit the 51 independent bi-static geometries can be utilised simultaneously for superposed measurements within the triangular prism. We can however simplify the continued discussion by only considering such configurations that cover the entire triangular prism, see FIG. 4. Let $\overline{C}$ be the centre of it and $\overline{A}_0$ some arbitrary one of the grid points that make up corners in its base. Call all grid points within two grid spacings from $\overline{C}$ by the angle they have relative to the vector $\overline{A}_0\overline{C}$. Thus $\overline{A}_0, \overline{A}_{120}, \overline{A}_{240}$ make the corners of the base, while the grid points $\overline{A}_{20}, \overline{A}_{60}, \overline{A}_{100}, \overline{A}_{180}, \overline{A}_{220}, \overline{A}_{280}, \overline{A}_{320}, \overline{A}_{340}$ are found within one more grid spacing.

Consider first the situation h=0. As is shown in FIG. 4, in this case 12 independent mono-/bi-static measurements with $\overline{A}_0$ as reception point which all cover the entire prism are possible. The bi-static angles are approximately distributed over all angles, i.e. the angular increment between the geometries is on average 40°. Assuming that all three corners $\overline{A}_0, \overline{A}_{120}, \overline{A}_{240}$ contain receivers, the triangular prism will be superposed by 36 measurements. Among these, bi-static measurements recur between the corners $\overline{A}_0, \overline{A}_{120}, \overline{A}_{240}$ twice each so that 34 of the measurements are independent. A part of these measurements will only cover the entire prism when h=0. Such is the case with transmissions from $\overline{A}_{20}, \overline{A}_{100}, \overline{A}_{140}, \overline{A}_{220}, \overline{A}_{280}, \overline{A}_{340}$. Thus it applies that 18 of the 34 measurements created by $\overline{A}_{20}, \overline{A}_{100}, \overline{A}_{140}, \overline{A}_{220}, \overline{A}_{280}, \overline{A}_{340}$ in combination with $\overline{A}_0, \overline{A}_{120}, \overline{A}_{240}$ have only partial coverage. In FIG. 4, where a target exists between centre $\overline{C}$ and $\overline{A}_{120}$, there are however transmissions from $\overline{A}_{20}, \overline{A}_{100}, \overline{A}_{140}, \overline{A}_{220}$ with reception in $\overline{A}_0, \overline{A}_{120}, \overline{A}_{240}$ which will also reach such targets (up to and including targets with heights somewhat higher than the grid spacing). It follows that the superposition of measurements in these cases is at least 28-fold (in fact there are further mono-static and bi-static measurements of the target comprising the stations in $\overline{A}_{60}, \overline{A}_{100}, \overline{A}_{140}, \overline{A}_{180}$ which we disregard here). The symmetry gives that the same nearly 28-fold coverage applies for alternative target placements between $\overline{C}$ and the triangle corner $\overline{A}_{240}$ and $\overline{A}_0$, i.e. the entire prism except the most extreme target heights.

Of course it is possible (even if we in the following do not study this case explicitly) to increase the step time according to a general formula $$t_{steg} = \frac{kd}{c}; k = 2, 3, \ldots$$

Thereby the signal registered at each grid point $\overline{P}$ can be uniquely assigned one of the transmitters in $\Psi[(k-1)d,\overline{P}]$. It is required that the transmission signal be divided up into 3k(k+1)+1 frequency steps.

Construction of radar sensors for the proposed sensor grid follows in most considerations conventional principles for radar. Thus transmission effect is chosen according to the bi-static radar equation $$PA = 4\pi \frac{R_{RX}^2 R_{TX}^2}{\sigma_N} \frac{kT\Omega}{t_{int}}$$

The left side consists of the size parameters of the radar in the form of the average effect P of the transmitter, and the effective area A of the receiving antenna. The right side defines requirements on the radar function regarding noise equivalent radar target area $\sigma_N$, range between target and receiver $R_{RX}$, range between transmitter and target $R_{TX}$, noise temperature T, integration time for Doppler estimation of (bi-static) approaching velocity $t_{int}$, and the angular volume $\Omega$ requiring coverage by the radar transmitter. The most demanding cases power-wise are when $R_{RX} \approx 2d$ and $R_{TX} \approx d$ or vice versa. We then obtain $$PA \approx 16\pi \frac{d^4}{\sigma_N} \frac{kT\Omega}{t_{int}}$$

An upper limit for $t_{int}$ is set by the uncertainty of target manoeuvres. This requires that Doppler measurements are renewed at a certain rate and that $t_{int}$ is limited reciprocally to this rate. The uncertainty is caused partly by change of the velocity vector of the target during manoeuvres, partly by change of the orientation of the target in space, which changes the position of the phase centre for scattering of the radar signal in the target. The limitations due to these effects are expressed by the differences $$t_{int} \leq \sqrt{\frac{\lambda}{2a_{man}}}$$
$$t_{int} \leq \frac{v_{man}}{a_{man}} \frac{\lambda}{\Delta R}$$

where $a_{man}$ is the characteristic acceleration for target manoeuvres and $v_{man}$ is the characteristic target velocity during manoeuvres, $\Delta R$ is the range resolution and $\lambda$ is the radar wavelength.

A lower limit for $t_{int}$ is set by the requirement on Doppler unambiguity. The proposed sensor grid works according to the above with frequency steps, which are received during fixed time intervals $t_{steg}$ determined by the grid spacing d. As 19 such steps must pass between transmissions of the same frequency, Doppler ambiguities arise in a way that is well-known in radar when the repetition frequency becomes too low in relation to the transmitted frequency and expected target velocities.

These ambiguities can be solved in the present case, as the range resolution is high. Doppler velocity can according to well-known principles for matched filtering be sorted into bins with different degrees of linear range walk during the time of integration. These bins are then sorted with matched filtering in different Doppler shifts. If then arisen Doppler ambiguities lie outside of the velocity resolution for linear range walk they can be sorted away, whereby the Doppler velocity is determined unambiguously. The velocity resolution obtained on sorting according to range walk is $\Delta v_{AR} = 2\Delta R/t_{int}$. Since ambiguous Doppler velocity is $\lambda f_{SRF}/2$, where $f_{SRF}$ is the signal repetition frequency, the condition for unambiguous Doppler velocity determination is obtained $$t_{int} f_{SRF} \geq \frac{4\Delta R}{\lambda}$$

It is evident that the resolution must be good in relation to the wavelength and that the integration time must be sufficient. As $f_{SRF}=1/19\ t_{steg}$ and $t_{steg}=3d/c$ then $$t_{int} \geq 228 \frac{d\Delta R}{c\lambda}$$

Based on the limitations implicated by the accelerations two conditions are obtained for necessary radar wavelength $$\left. \begin{array}{l} \lambda_{min} \geq \sqrt[3]{103968 \frac{a_{man} d^2 \Delta R^2}{c^2}} \\ \lambda_{min} \geq \Delta R \sqrt{228 \frac{a_{man} d}{c v_{man}}} \end{array} \right\}$$

In an embodiment suitable for surveillance over large areas the grid spacing is e.g. chosen d=20 km. Furthermore, if $a_{man}$=100 m/s$^{-2}$, $v_{man}$=100 ms$^{-1}$ and $\Delta R$=2.5 m, then $\lambda_{min}$=0.7 m and $\lambda_{min}$=0.3 m respectively are obtained. Consequently relatively low radar frequencies are suitable, which harmonise well with no requirement for angular resolution and consequently the aperture does not have to be made large in relation to the wavelength.

The integration time with $\lambda_{min}$=0.7 m is $t_{int}$=0.06 s. If we choose for example the transmitting antenna only to cover the air space i.e. the upper hemisphere and that this occurs isotropically then $\Omega=2\pi$ sterad. When setting $\sigma_N$=0.1 m$^2$ and A=1 m$^2$ the necessary average power according to the radar equation becomes P=36 W.

In another embodiment for combat field surveillance d=1 km is chosen. In this case it is of interest to look out for manoeuvring missiles and projectiles and therefore $a_{man}$= 100 m/s$^{-2}$, $v_{man}$=300 ms$^{-1}$ and $\Delta R$=0.5 m. We get $\lambda_{min}$=0.03 m and $\lambda_{min}$=0.01 m respectively for the two wavelength criteria. The integration time with $\lambda_{min}$=0.03 m becomes $t_{int}$=0.01 s. Assume again that $\Omega=2\pi$ sterad and that $\sigma_N$=10$^{-4}$ m$^2$ and A=0.1 m$^2$. The necessary average power according to the radar equation then becomes P=10 W.

A further aspect which must be observed is self-blinding, i.e. the phenomenon where the transmitter signal for a bi-static radar facility directly illuminates the receiver antenna and negatively affects the receiver function. A method for avoiding self-blinding can be to design the directional characteristics of the antennae in a suitable way. It is e.g. possible to design vertical directional characteristics so that ground interaction is minimised at the same time as the antennae neither are transmitting nor being sensitive to signals which propagate horizontally and thus between adjacent radar stations. On the other hand the ability to measure low-flying targets is very desirable, which places requirements on the antenna effect especially in the horizontal direction (a certain vertical beam formation is also desirable and will be discussed further below). It is also possible to form the directional characteristics in bearing direction with zeroed antenna effect in bearings directed towards adjacent radar stations. This is also not a suitable method for eliminating the blinding effect as the sectors with zeroed antenna effect must be very narrow to avoid a noticeable decrease in the performance of the system. Low frequencies, which above were found suitable for larger surveillance systems, thereby place requirements on large antennae, which is hardly possible in a system built on many cooperating stations.

Consequently the effect of the directional characteristics of the antenna can hardly be utilised to avoid blinding. However the limitation in performance due to this effect can be minimised through suitable design of the transmission and reception functions. There are two relatively contrasting ways to go. One is based on a careful maintenance of an equidistant grid. In this way during the step time $t_{steg}$=3 d/c the transmitter signal only affects the received signal during certain specific times namely $$\left. \begin{array}{l} t_0 + \dfrac{d}{c} \leq t \leq t_0 + \dfrac{d}{c} + \Delta t \\ t_0 + \dfrac{\sqrt{3}\,d}{c} \leq t \leq t_0 + \dfrac{\sqrt{3}\,d}{c} + \Delta t \\ t_0 + \dfrac{2d}{c} \leq t \leq t_0 + \dfrac{2d}{c} + \Delta t \\ t_0 + \dfrac{\sqrt{7}\,d}{c} \leq t \leq t_0 + \dfrac{\sqrt{7}\,d}{c} + \Delta t \end{array} \right\}$$

where $\Delta t$ is the transmission time and $t_0$ is some point of time for a new transmission step. If now a short transmission time is chosen and based on resolution i.e.

$$\Delta t = \frac{2\Delta R}{c}$$

it becomes completely acceptable that measuring data is not available during blinding. It is true that the measurement data spaces $S^2_\phi$, where $\overline{P}$ is part of the facilities $\phi$, will lack data for certain resolution cells in range direction due to blinding at the grid point $\overline{P}$. These resolution cells correspond through the projections $m_\phi$ with volumes in $S^6$ where the facility $\phi$ does not provide measurement values. Due to the multi-fold superposition of independent measurement geometries however only isolated resolution cells $X \subset S^6$ will lack three measurement values and practically no cells will lack more than three measurement values despite the blinding effect. The target positioning criterion given by $\alpha(X)=n'(X)/n(X)$ can be easily adjusted for this effect without noticeable degradation of performance.

The requirement of a strict and careful maintenance of an equidistant grid is however in most cases unsuitable. From a military point of view it is easy to use precision engagement of the grid when the grid points are exactly known. It can also be unsuitable out of a wave-propagation point of view or purely practical views to place radar stations in a predetermined configuration. As the radar equation determines average power, short pulses imply a requirement of high peak power, which is demanding on apparatus. One would rather instead through suitable coding of transmission signal utilise a duty cycle $$\eta = \frac{\Delta t}{t_{steg}} = \frac{c\Delta t}{3d}$$

which is reasonably large, e.g. $\eta$=10%. A way of handling the blinding problem that fulfils all of these wishes is based on the observation that the blinding signal is coherent with the signal reflected from the target. Thereby they can be distinguished by Doppler- and range analysis. However it is required that the Doppler analysis can take place with sufficient dynamics for this distinguishing, which places requirements on the radar receiver to be highly linear.

To investigate the requirement of receiver dynamics it is noted that the signal strength for the signal reflected from the target is determined by the radar equation and is $kT/t_{int}$ in each Doppler cell from a target with the target area $\sigma_N$. Maximal blinding at some grid point arises due to transmission from the six adjacent grid points i.e. during the time interval $$t \approx t_0 + \frac{d}{c} t_0 + \frac{d}{c} + \Delta t$$

The strength of the blinding signal is thereby estimated to be $$P_{blind} < 6 \frac{4\pi}{\Omega} \frac{A}{d^2} P_{top} = 6 \frac{4\pi}{\Omega} \frac{A}{d^2} \frac{P}{\eta}$$

Necessary dynamics in Doppler analysis is then $$N_{int} < t_{int} \frac{P_{blind}}{kT} = 6 \frac{4\pi}{\Omega} \frac{A}{d^2} t_{int} \frac{P}{kT}$$

Necessary dynamics in reception become $$N_{RX} < \frac{2\Delta R}{c} \frac{P_{blind}}{\eta kT} = 6 \frac{4\pi}{\Omega} \frac{A}{d^2} \frac{2\Delta R}{c} \frac{P}{\eta kT} \text{ or}$$

$$N_{RX} < 384\pi^2 \frac{2\Delta R}{ct_{int}} \frac{1}{\eta} \frac{d^2}{\sigma_N}$$

where c/2 ΔR is the full filter bandwidth of the receiver. In both the given examples the requirement on receiver dynamics is at most around 70 dB for η=10%. It is a quite possible and well-known technique to adapt the receiver function for handling these dynamics, at least for the example utilising the low radar frequencies. Note also that 70 dB reception dynamics is an extreme case. Among other things the maximal blinding signals exist at the beginning of the reception period and then only together with targets lying near to the reception station. For distant targets with their weak signals there are only interference signals from transmitters at larger distances. In these cases the blinding signal is suppressed by i.a. a noticeable screening provided by the terrain. Necessary momentary receiver dynamics is therefore about 50–60 dB. The receiver function can be simplified in this way with so-called AGC (Automatic Gain Control) which gives momentary adaptation of the dynamics to the level for the incoming signal.

Regarding the methods for coherent suppression of the blinding signal it is noted that the duty cycle should be large in contrast to the method described first. Note also that the coherent blinding suppression method itself concerns reception of the direct transmission signals between facilities. This gives an obvious method for synchronising between stations, which is necessary for the bi-static function.

A last aspect that needs illumination regarding sensor design is antenna construction. An important advantage with conventional radar technique built on high-degree directional sensitivity is that this naturally lets itself be combined with a capacity to suppress interfering sources by zeroing the directional sensitivity in interference directions. The proposed radar grid requires a corresponding functionality for the individual radar stations. When such a function exists the fact that radar stations cooperate bi-statically across the surface will increase the resistance to interference, as this grid structure of stations places requirements on interferences being simultaneously carried out in a multi-fold of directions.

Figure 5:
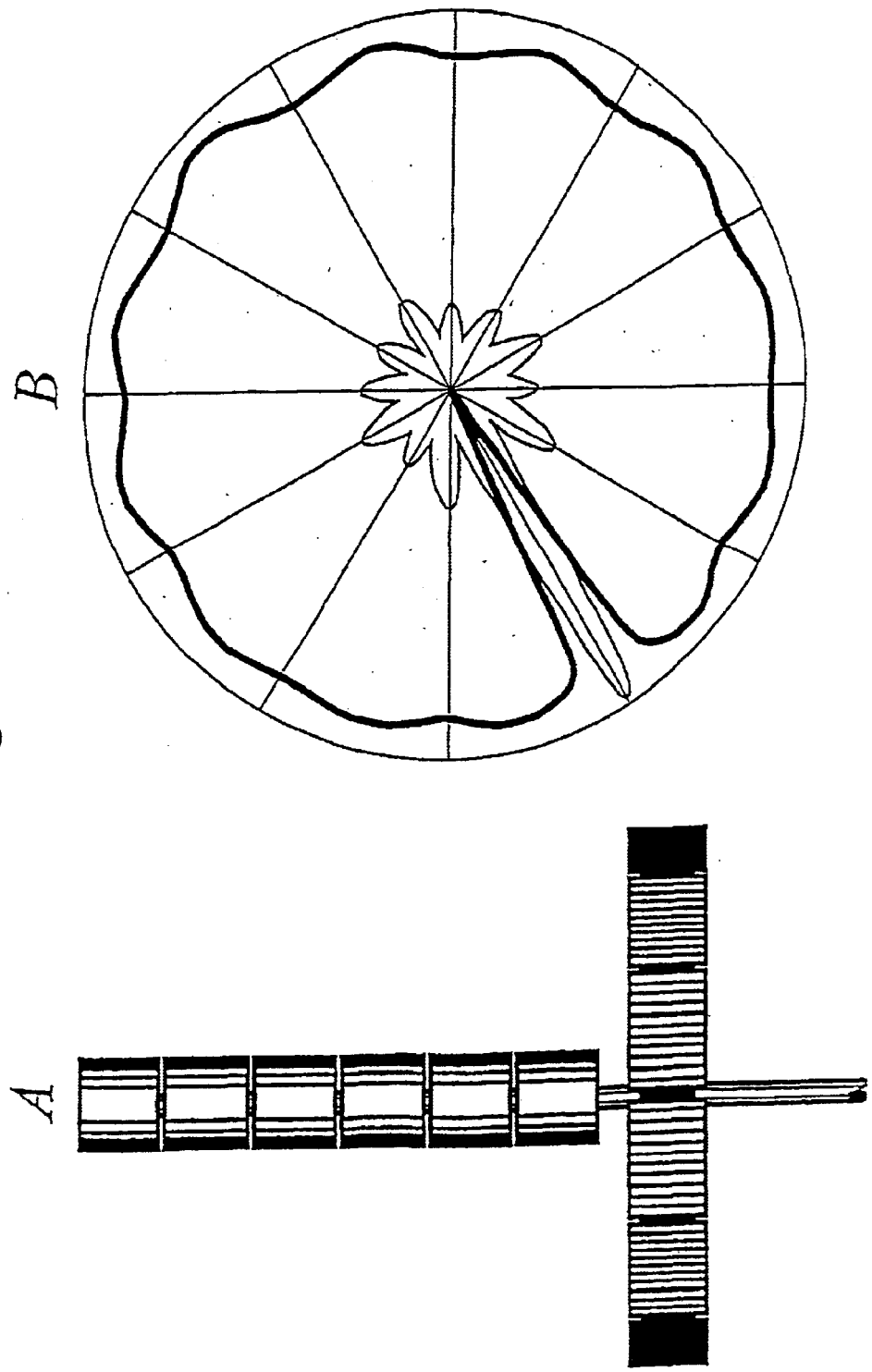

FIG. 5 illustrates in A, seen from the side, a suitable antenna construction for the radar station in an individual grid point for the low-frequency radar system. The points of view given below concern mainly this system. The antenna construction combines the necessary in bearing direction isotropic directional characteristic with suitable vertical directional characteristic. It also has the desired ability to suppress interference. The antenna consists of two parts. The first part consists of a vertical column of a number of identical simple antenna elements, e.g. dipoles. The number of elements is chosen so that sufficient antenna amplification is obtained in the vertical direction. The directional characteristic in bearing remains isotropic. The other part is comprised of a ring concentric to the column, consisting of a number of simple antenna elements. If there are N antenna elements in the ring, it is well-known that N–1 linear combinations of signals from the antenna elements can be formed, where each is only sensitive to the signal from one of N–1 optional directions. By also linearly combining the signal from the ring and the column a directional characteristic can instead be obtained where the directional sensitivity is zeroed in these N–1 optional directions. In B is shown such a conclusion that is insensitive in one direction as a result of the ring antenna being made sensitive only for this direction.

Combinations of signals from ring and column are utilised to suppress interferences at reception, in the first hand such which are intended to degrade the radar function in a military conflict. On transmission only the antenna elements in the column are utilised, which are combined to a directional characteristic which mainly directs the transmission beam horizontally, so that it reaches the intended range with fanning up to intended height. On reception, more reception channels are necessary for simultaneous surveillance of all elevation directions. The assumed antenna surface A=1 m² at the wavelength $\lambda_{min}$=0.7 m requires approximately 10 antenna elements in height (the antenna column becomes thereby 3.5 m high). Ideally each antenna element has its own receiver. However such a construction becomes unnecessary as the antenna aperture projected in the elevation direction decreases and the vertical directional characteristic becomes less and less pronounced. 10 antenna elements therefore give only about 5 uncorrelated vertical antenna directions, whereby an analogous signal forming network makes at most five independent receiver channels necessary.

Suppression of interferences requires that more receiver channels be connected to the antenna ring. Just as many receivers are needed as the number of elements in the ring, which number as mentioned must be larger than the expected number of interfered directions. Note again that no requirement on extreme receiver dynamics is needed, as the aim with suppression of interferences is to coarsely suppress the main part of the interfering energy. Thus it is not needed that receivers connected to the ring have sufficient sensitivity to detect targets, but rather it is sufficient that the receivers being connected to the column have this ability.

In FIG. 6 is shown an example of an appropriate fundamental arrangement of a radar station in one grid point. The radar station is built around the antenna system described in FIG. 5. The column antenna is utilised for transmission and reception, whereby transmission signals are generated according to the transmission pattern for stepped frequency described in FIG. 4. A system for signal combination contains necessary switching functions between transmission and reception and delay filters for the formation of vertical directions which are separately received by different receivers and transformed to digital signals.

Suppression of interferences requires more reception channels. For these it is advantageous to make signal combination after digital transformation, AD, to form narrow antenna beams in the interference directions, which by delay and summation can be made to correspond to the total interference signal coming towards the column antenna. Interference-reduced radar signals are obtained by essentially a subtraction (in fact a weighted such with different weight factors for different elevation directions). By matched filtering, MF, with regard to the transmission signal, a distribution is obtained of the received signals over range and approaching velocity. After this target detection, Det, takes place by CFAR-thresholding for each elevation direction. Knowledge of elevation directions is not in itself necessary for continued processing. Detections of range and approaching velocity can further be put together to reduce data in the communication with the analysis equipment.

What is claimed is:

1. A system for using signals scattered by targets to determine position and velocity for each of the targets in a position space, comprising a set of transmitters and receivers of electromagnetic or acoustic signals, said transmitters and receivers dispersed to known points in the position space, where each pair of transmitter and receiver, mono-static or bi-static, is named a measuring facility, further comprising analysis equipment for storage and analysis of received signals, which includes determination of instants for transmission and reception according to established principles for radar and parameterising of received signals as a function of path between point of transmission and point of reception, however without the usual requirement in radar on directional information, characterised in that the range of the transmitters is chosen so that one target at an arbitrary point within the position space can be measured via scattering in the target by at least four measuring facilities, that for each measuring facility a target detection takes place with constant false alarm rate—CFAR—where the noise intensity is given a threshold value and the cells where the signal intensity surpasses the threshold value are given to be target candidates, that the analysis equipment utilises a target positioning algorithm that implies that each measuring facility $\phi$ places $n_\phi$ target candidates in $n_\phi$ of N resolution cells in a 2-dimensional linear space of range and Doppler velocities $S^2_\phi$ associated to the measurement facility and that 3-dimensional positions and 3-dimensional Doppler velocities are represented as a 6-dimensional linear position and velocity space $S^6$ partitioned into $N^3$ resolution cells $X \subset S^6$ with the same resolution of range and Doppler velocity as found in the measurement facilities and that the analysis equipment, based on the assumption that there is equal probability that a target is found in each and every of the cells $X \subset Y_{j\phi}$, where $Y_{j\phi} \subset S^6$ is a sub-set representing a single target candidate $j=1, 2, \ldots, n_\phi$ at some single measuring facility $\phi$, and also based on the expected number of targets $$M = \max_{\forall \varphi} n_\varphi,$$

calculates, for each cell $X \subset Y_{j\phi} \cap Y_{j'\phi'} \cap \ldots \cap Y_j(n)_{\phi(n)}$ which represents detections at least $n \geq 4$ measuring facilities, the probability $p^{FA}(n,M,N)$ that the cell contains a false alarm emanating from intersections between sub-sets $Y_{j\phi}$ which originate from different targets and gives, when the probability falls below a predefined value, that the intersection contains at least one target and extracts through this target positions and target velocities.

2. System according to claim 1, characterised in that transmitter and receiver are placed as grid points in an essentially equidistant grid on a surface, which bounds the surveyed position space with the distance between the corner points essentially the same, d, and where the range of the signals when having an essentially planar surface is at least 2d, implying at least 6 independent bi-static configurations per grid point and that the range, in the case where the surface is not essentially planar, is adapted to give just as many bi-static configurations as in the planar case.

3. System according to claim 2, characterised in that a pair consisting of a transmitter and a receiver are placed as said grid points in the essentially equidistant network.

4. System according to claim 2, characterised in that the system also utilises the combined transmitters/receivers for mono-static measurements.

5. System according to claim 2, characterised in that when the range of the signals is kd; k=2, 3, . . . and where thus the signals from 7, 19, . . . , 3 k(k+1)+1, . . . grid points must be distinguishable by each receiver, the total bandwidth B for the signal is partitioned into 3 k(k+1)+1 adjacent sub-bands, where each sub-band transmits within a hexagon of 3 k(k+1)+1 grid points and is received by the middle station in the hexagon, after which, when the signals scattered by targets have been registered, a new distribution of sub-bands among grid points within the hexagon is sent until each grid point within the hexagon has sent each sub-band within the total bandwidth, and that this transmission pattern is copied through translations in the grid to congruent hexagons of 3 k(k+1)+1 grid points covering an arbitrarily large surface, whereby it is achieved that each receiving station never obtains the same sub-band from more than one grid point within the assumed range and each subband can be uniquely traced to the grid point of its transmission.

6. System according to claim 1, characterised in that the analysis equipment determines for each resolution cell $X \subset S^6$ a first integer value n(X) which is the number of measuring facilities that have a range allowing them to detect targets lying in the resolution cell, and a second integer value n'(X) which is the number of measuring facilities which actually detect targets at that range and with the Doppler velocity which means that a target can lie in the resolution cell and that the analysis equipment for each resolution cell forms the quotient $\alpha(X)=n'(X)/n(X)$ and states that the resolution cell X contains a target if the quotient $\alpha (X)$ exceeds a predefined value which is chosen depending on the certainty of detecting targets in a given resolution cell and which is therefore larger than zero and less than or equal to one.

7. System according to claim 6, characterised in that the resolution cells are first chosen essentially larger than the range- and Doppler resolution, that the resolution cells $X \subset S^6$ which the analysis equipment indicates to contain targets are partitioned in such a way into two or more resolution sub-cells that the number of resolution sub-cells after partitioning is essentially as large as the initial number of resolution cells, that the analysis equipment then carries out a corresponding second analysis of the new set of resolution sub-cells and those resolution sub-cells are chosen and given to contain targets which fulfil the chosen requirement, after which the cells which have been given to contain a target are partitioned again and a new analysis is done until the final resolution sub-cell size converges with the resolution of range- and Doppler velocity.

8. System according to claim 7 characterised in that at least two cell subdivisions are utilised starting from a predefined subdivision level, and which has cells congruent but different from each other for each subdivision level a translation a fraction of the cell length in the spatial domain, that the analysis equipment carries out its analysis on all cell subdivisions, whereby the target position can be established to fractions of the spatial cell length in that the target is detected in certain overlapping cells at a certain subdivision level and therefore is completely contained in the intersection of these cells.

9. System according to claim 8, characterised in that $\alpha$ (X)$\approx$1 for resolution cells with a spatial extension down to the maximal size of an expected target and that $\alpha$ (X)=4/n (X) for smaller resolution cells.

10. System according to claim 1, characterised in that the transmitters and receivers comprise an antenna arrangement consisting of a number on a mast, along a vertical axis, located antenna elements which via a feeding network together give a 3-dimensional radiation diagram with a main part of the energy uniformly distributed within a cone with regard to the vertical axis and where the cone angle can be controlled by imposing varying phase shifts on the different antenna elements during feeding of the elements and a number of antenna elements arranged along a horizontal circle that is concentric with the vertical axis, with essentially even distribution of the antenna elements along the circle and a feeding network for antenna elements, such that one or more beams directed horizontally can be obtained by imposing varying phase shifts on the different antenna elements during feeding of the elements and a unit which by linear combination combines signals from the horizontally and vertically oriented elements, so that the signal from the horizontal ring is subtracted from signals from the vertically arranged antenna elements, which results in a radiation diagram that is insensitive in directions where the horizontal ring has directed beams.

* * * * *